United States Patent
Caracci et al.

(10) Patent No.: US 6,445,838 B1
(45) Date of Patent: Sep. 3, 2002

(54) TUNABLE OPTICAL COMPONENT

(75) Inventors: Stephen J. Caracci, Elmira; John D. Downie, Painted Post; Sean M. Garner, Corning, all of NY (US); Christophe Nicolas, Bicetre (FR)

(73) Assignee: Corning Incorporated, Corning, NY (US)

(*) Notice: Subject to any disclaimer, the term of this patent is extended or adjusted under 35 U.S.C. 154(b) by 80 days.

(21) Appl. No.: 09/676,413

(22) Filed: Sep. 29, 2000

(51) Int. Cl.⁷ .............................. G02B 6/12; H04B 10/12
(52) U.S. Cl. .............................. 385/14; 385/15; 385/27; 385/54; 359/173
(58) Field of Search .............................. 385/14, 15, 59, 385/27; 372/20, 29.022; 359/173, 127

(56) References Cited

U.S. PATENT DOCUMENTS

| | | | |
|---|---|---|---|
| 3,984,190 A | 10/1976 | Barrett et al. | 356/75 |
| 4,482,248 A | 11/1984 | Papuchon et al. | 356/346 |
| 4,830,451 A | 5/1989 | Stone | 385/31 |
| 4,861,136 A | 8/1989 | Stone et al. | 385/27 |
| 5,024,505 A | 6/1991 | Junji et al. | 385/94 |
| 5,027,435 A * | 6/1991 | Chraplyvy et al. | 359/173 |
| 5,037,180 A | 8/1991 | Stone | 385/123 |
| 5,212,745 A | 5/1993 | Miller | 385/25 |
| 5,212,746 A | 5/1993 | Miller et al. | 385/25 |
| 5,251,275 A | 10/1993 | Kuriyama et al. | 385/14 |
| 5,283,845 A | 2/1994 | Ip | 385/24 |
| 5,289,552 A | 2/1994 | Miller et al. | 385/73 |
| 5,359,687 A | 10/1994 | McFarland et al. | 385/49 |
| 5,375,181 A | 12/1994 | Miller et al. | 385/27 |
| 5,422,970 A | 6/1995 | Miller et al. | 385/72 |
| 5,425,039 A | 6/1995 | Hsu et al. | 372/6 |
| 5,563,973 A | 10/1996 | Miller et al. | 385/81 |
| 5,739,945 A | 4/1998 | Tayebati | 359/291 |
| 6,097,530 A | 8/2000 | Asher et al. | 359/288 |

FOREIGN PATENT DOCUMENTS

| | | | | |
|---|---|---|---|---|
| EP | 0903615 A2 | 9/1998 | | G02F/1/21 |
| EP | 1016884 A2 | 12/1999 | | G02B/6/28 |
| WO | WO 99/34484 | 7/1999 | | |
| WO | WO 00/28355 | 5/2000 | | G02B/6/00 |

* cited by examiner

Primary Examiner—Georgia Epps
Assistant Examiner—M. Hasan
(74) Attorney, Agent, or Firm—Juliana Agon

(57) ABSTRACT

Multiple uses are made available with an optical component (10) that is based on a fiber Fabry-Perot resonator (12). The optical component (10) includes substrate (14) having a variable length (16) for supporting and tuning the Fabry-Perot resonator (12) by varying the variable length (16) of the substrate (14) in response to a variable stimulus. A plurality of fiber retainers (22) are disposed on the substrate (14) for mounting and aligning the fiber Fabry-Perot resonator (12). To fix the position of the fiber Fabry-Perot resonator (12) relative to the substrate (14) and to define the variable length (16), a pair of binders (24) are disposed on the substrate (14) proximate selected opposed pairs (221 and 222) of the plurality of the fiber retainers (22).

20 Claims, 10 Drawing Sheets

FIG. 2  THERMALLY TUNABLE FABRY-PEROT FILTER

FIG. 8
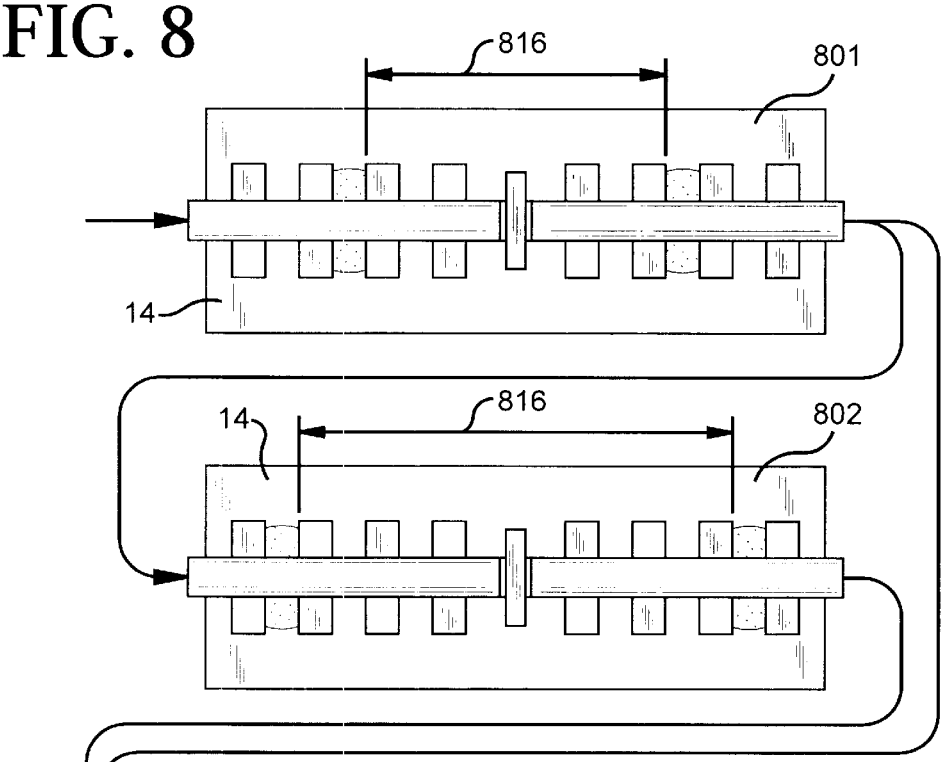
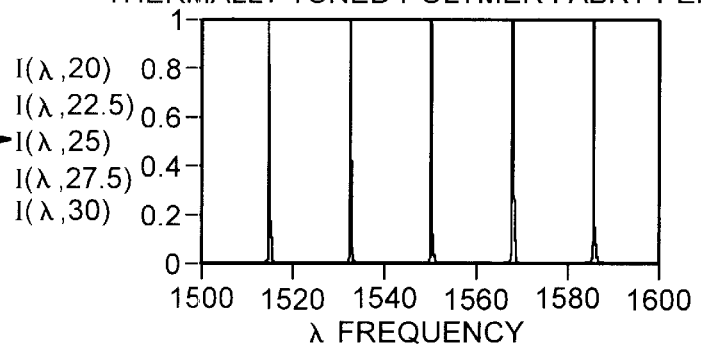
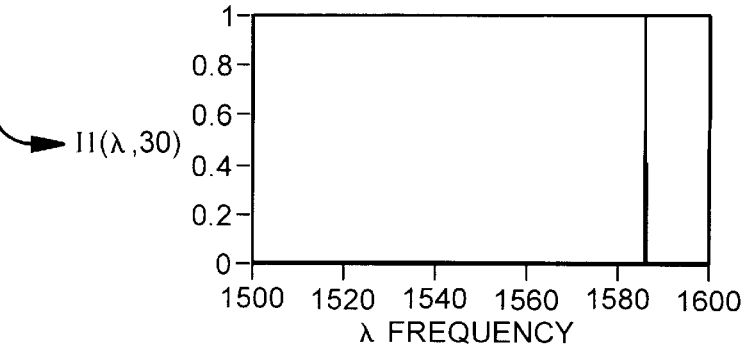

TUNABLE OPTICAL COMPONENT

BACKGROUND OF THE INVENTION

1. Field of the Invention

The present invention relates generally to optical components, and particularly to tunable optical components.

2. Technical Background

Various optical components for use in optical communication systems, such as systems using wavelength division multiplexing (WDM), are known. Wavelength division multiplexing is commonly used to more efficiently utilize the scarce resource of bandwidth for high-speed data transmission in an optical fiber network. In a WDM system, each high-speed data channel transmits the information contained within the channel at a pre-allocated wavelength on a single optical waveguide, such as an optical fiber. By sharing the transmission medium of the common waveguide, multiple high speed data signals can be multiplexed for transmitting data to a distant location. -At the receiver end, channels of different wavelengths are separated by narrow-band filters and then detected, optically monitored or otherwise used for further processing. As WDM systems multiplex higher and higher densities of wavelength channels, filters of very narrow bandwidths become an increasing need. Such WDM systems require tunable or reliably fixed (or compensated) optical components to provide accurate band selection and spectral purity, along with other optical components which add to the WDM system complexity and reliability requirements.

Examples of tunable or fixed optical components include tunable Fabry-Perot (FP) filters and applications using the (FP) filtering principle to provide further wavelength selective components, such as circulators and one-port or multi-port wavelength add/drop multiplexers or demultiplexers, modulators, variable optical attenuators, isolators, and switches. Such filters can be narrow-band or wide-band bandpass filters. When used as bandpass filters in the appropriate band, the FP filters provide for channel selection in wavelength-division-multiplexing.

Generally, Fabry-Perot (FP) filters, resonators, etalons, interferometers or other FP optical components having FP cavities are very simple devices and well-known in theory. Whether a FP component is called a filter, an etalon, an interferometer, or another name typically depends on personal preference and the particular application. One application for a tunable FP filter is in optical performance monitoring. By changing the cavity length of a high finesse Fabry-Perot filter, information about the optical signal-to-noise ratio and power level can be determined. As is known, the finesse (F) of the FP filter is a quality index that refers to the resolution of the filter. The monitoring of system performance is becoming more important due to system complexity and reliability requirements.

Quality monitoring of the signals circulating in optical fiber networks is typically performed by using high resolution spectral or interferometric analysis. For WDM mode transmission, the power and the signal-to-noise ratio of each channel is measured. An optical performance monitoring (OPM) module typically includes an electronic data processor along with the scanning optical filter. A scanning optical filter is just a fixed (or compensated) filter where the wavelengths are varied or scanned. In contrast, a tunable filter is a variable filter where the resonant wavelength of the filter can change by changing a parameter of the filter itself.

Basically, in a typical Fabry-Perot cavity, the cavity length determines important parameters; the free spectral range (FSR) and the resonant cavity frequency (or wavelength) of the resonator or filter. One common Fabry-Perot tunable filter approach utilizes piezoelectric or heat-sensitive actuators to change the cavity length by an appropriate amount to result in a tunable resonant frequency (or wavelength). These FP components can be based on cavities formed by the faces of two GRIN lens collimators or the cleaved facets or reflective faces of two optical fibers. The GRIN lens collimator is a short segment of a radially graded-index (GRIN) medium that can collimate light as the light propagates through the medium. In both cases of collimators or facets, care in alignment and other manufacturing factors must be taken to maintain a high cavity finesse F to assure a narrow bandwidth filter. For example, cavities with a finesse F value of ~2000 correspond to a filter bandwidth of only 5 Ghz (or 40 pm).

The best spectral resolution is obtained with a Fabry-Perot interferometer (FPI) which is just a specific application of a FP filter in which the cleaved faces of opposing optical fibers are facing each other in an air gap of an air cavity. The air gap between the two faces can be made very small (a few $\mu$m), so that the free spectral range (FSR) of the resonator or filter is wide. Each face is usually covered by a multilayer high reflectivity mirror. A lightwave, guided by the first fiber, exits partially into the air cavity, and is submitted to multiple reflections on both mirrors. Part of the energy is coupled into the second fiber, which is connected to an optical detector.

The optical alignment of the two fiber cores to ensure proper concentricity is a very critical manufacturing step. As the guided wave exits the first fiber, the guided wave diverges or diffracts while traversing the air gap. In the general classification of optical resonators, the plane-plane air cavity is "unstable" and can have a low finesse F value. In a fiber based FP cavity, the expansion of the optical mode across the cavity degrades the cavity finesse F. One solution to reduce the optical loss of such a resonator, consists in introducing in the resonator a piece of fiber, whose thickness is very precisely determined. In a commercially available device, a short section of fiber (fiber stub or wafer) is used inside the cavity to maintain the optical mode size and hence the cavity finesse. However, this method is time consuming, and leads to high manufacturing cost.

Various forms of FP components are known, including advanced technological structures based on liquid crystals, microelectro-mechanical systems (MEMS) and polymer films deposited on a non-expanding substrate, that may still have to be carefully aligned with the transmissive medium. However, current tunable optical filters that are available and that have gone through extensive reliability testing are much simpler mechanically, as with a cavity created in a fiber ferrule assembly, but can be as expensive as $10,000 a piece.

Accordingly, a need exists for a high finesse FP optical component that can be inexpensively and easily created, exhibit a practical manufacturable form, and minimize losses from misalignments.

SUMMARY OF THE INVENTION

One aspect of the present invention is the multiple uses made available of an optical component that is based on a fiber Fabry-Perot resonator. The optical component includes a substrate having a variable length for supporting the Fabry-Perot resonator by varying the length of the substrate in response to a stimulus. A plurality of fiber retainers are disposed on the substrate for mounting and aligning the fiber Fabry-Perot resonator. To fix the position of the fiber Fabry- Perot resonator relative to the substrate and to define the variable length, a pair of binders are disposed on the substrate.

In another aspect, the present invention uses a heat-sensitive substrate such as silicon, silica or polymer.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 8 is a representation of a thermally tuned Fabry-Perot filter with a reference wavelength source, implemented by similar optical components 10 of FIG. 1, in accordance with the teachings of the invention;

DETAILED DESCRIPTION OF THE PREFERRED EMBODIMENTS

Figure 1:
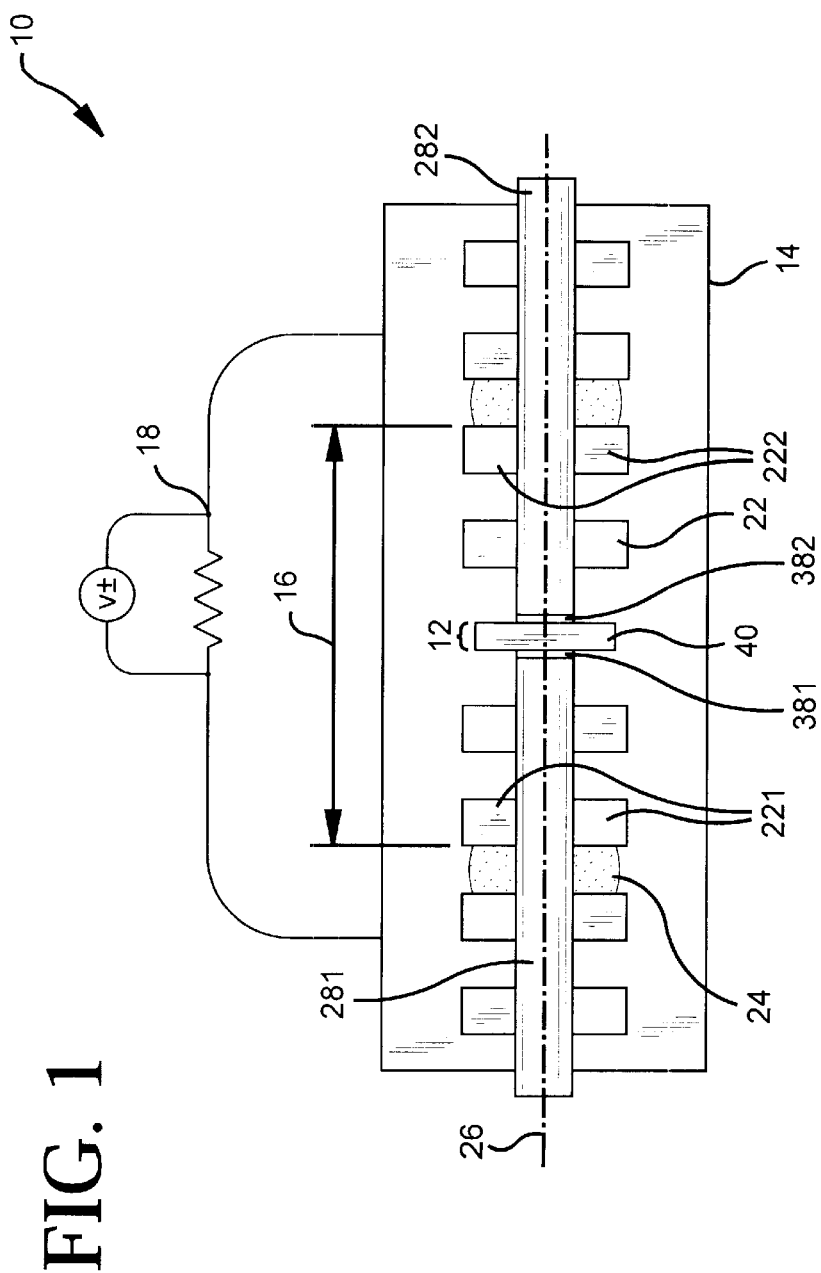
FIG. 1 is a top view of an optical component 10, in accordance with the teachings of the invention.

Reference will now be made in detail to the present preferred embodiment of the invention, examples of which are illustrated in the accompanying drawings. Wherever possible, the same reference numbers will be used throughout the drawings to refer to the same or like parts. An exemplary embodiment of the optical component 10 of the present invention is shown in FIG. 1, and is designated generally throughout by reference numeral 10.

Referring to FIG. 1, multiple uses are made available with an optical component 10 that is based on a fiber Fabry-Perot resonator 12. The optical component 10 includes a substrate 14 having a variable length 16 that is variable in response to a stimuli 18. Suitable substrate materials are available that are responsive to stimuli, such as pressure, mechanical pulling, electrical-magnetic poling, or other external forces. For example, a heat-sensitive substrate 14 having a temperature-sensitive length 16 for supporting and temperature-tuning the Fabry-Perot resonator 12 by varying the temperature-sensitive length 16 of the heat-sensitive substrate 14 in response to a temperature variance 18 that is provided by resistive heating or temperature compensation of the resonator 12 due to ambient temperature effects can be one embodiment of the teachings of the present invention. Note that while the temperature variance 18 is depicted as a resistive heater, other heaters/coolers, such as a thermoelectric cooler, regulators, controllers, devices capable of maintaining or tuning the substrate temperature can be used. Furthermore, other applicators for applying other forces can also be substituted for the resistive heater.

Continuing with the example, a plurality of fiber retainers 22 are disposed on the heat-sensitive substrate 14 for mounting and aligning the fiber Fabry-Perot resonator 12. To fix the position of the fiber Fabry-Perot resonator 12 relative to the heat-sensitive substrate 14 and to define the temperature-sensitive length 16, a pair of binders 24 are disposed on the heat-sensitive substrate 14. Even though the binders 24 are shown proximate selected opposed pairs 221 and 222 of the plurality of the fiber retainers 22, the binders 24 need not touch the retainers 22 at all but simply affix to the substrate 14. The plurality of fiber retainers 22 forms two rows. Preferably, each of the optical fiber retainers are polymeric fiber grippers and each has an inner surface facing one of two parallel axes such that a substantially axial passage 26 is formed therethrough.

Alternatively, the substrate 14 is made from silica which is expandable in response to the stimulus of heat or a piezoelectric material which is expandable in response to the stimulus of voltage. For ease of manufacturability, the plurality of retainers 22 would then be made from a silicon material in the shape of V-grooves, such as used in silicon optical benches.

Figure 3:
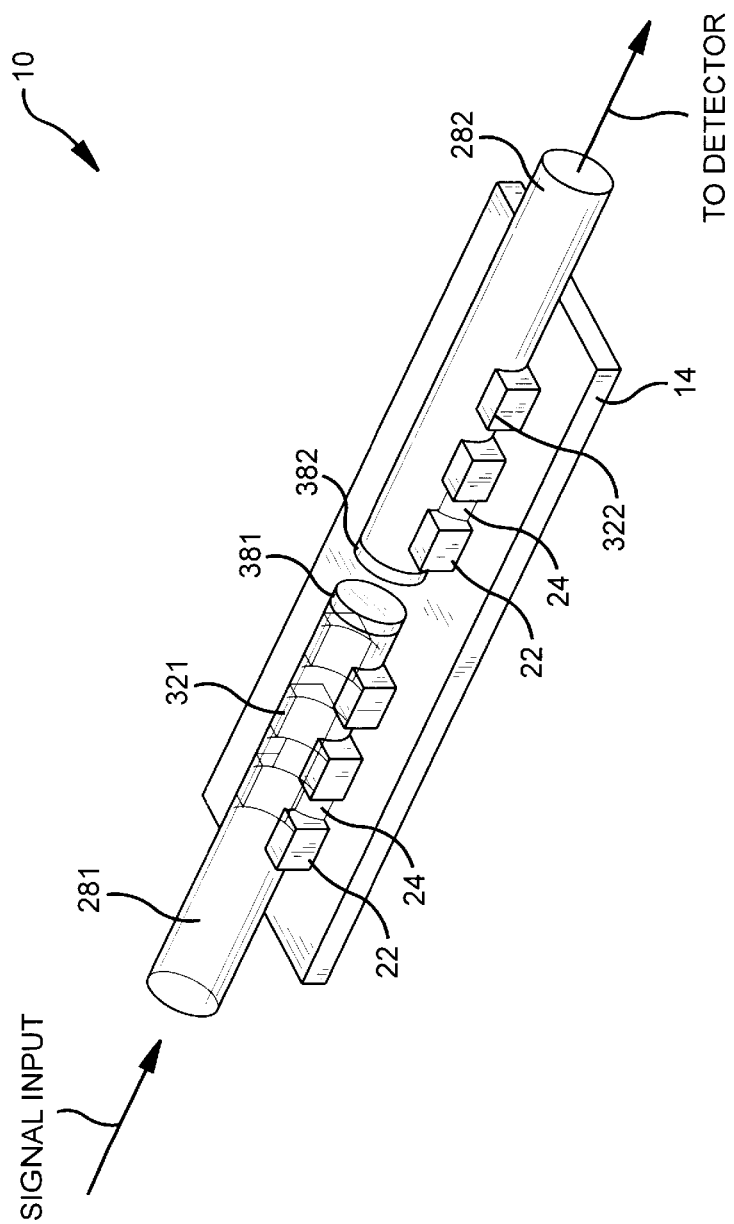
FIG. 3 is a perspective representation of a second embodiment of the optical component 10, in accordance with the teachings of the invention.

With this arrayed retainers, whether they are polymeric gripper or silicon V-grooves, the substantially axial passage 26 allows a pair of optical fibers 281 and 282 to be mounted within the passage 26 and positioned by the retainers or grippers 22 on both sides of the fibers 281 and 282. It is to be noted that the retainers 22 shown with straight lines, as a rectangular or square block for simplicity, need not be so limited, but preferably have a wider width at the top than at the bottom of the retainer 22 to provide a higher vertical restraining pressure on the fiber 281 or 282. Additionally, although these rows of retainers 22 are exemplified by grippers formed and paired on both sides of the fibers 281 and 281 in a linear fashion, forming a horse-shoe-like or upside-down omega ($\Omega$) configuration or a partial-ring cross-section with the top surface of the heat-sensitive substrate 14, to exert an equal and opposed force on each side of the fiber, the retainers 22 need not be in such a linear and paired alignment. Alternatively, each individual retainer 22 of one row does not have to be aligned with a corresponding retainer of the other row, such that the retainers 22 can be offset from each other, similar to a zig-zag configuration, as seen in FIG. 3. Indeed, the retainers 22 need not be of the same size but one retainer 321 may be taller than another, or preferably, at least one retainer 322 has a wider width at the top, as depicted in FIG. 3. Subsequently, the binder 24 may also be applied in a non-linear or linear fashion, depending on the desired "length" effects on the substrate 14 due to the temperature change. For example, if a linear application of the binder 24 is not needed to define the changeable length 16, than the binder 24 can be adhesively bonded anywhere along the length of the fibers 281 and 282 at positions where a retainer 22 is or is not near.

The fiber Fabry-Perot resonator 12 is thus provided from the resonance cavity defined by the reflective ends 381 and 382 of each of the fibers 281 and 282. The reflective ends 381 and 382 are opposed and separated from each other to provide an air cavity as the resonance cavity of the fiber Fabry-Perot resonator 12. To more precisely define the spacing of this air cavity, an optional cavity alignment feature 40, such as a predetermined thickness of a suitable polymer material can be inserted between the ends 381 and 382 before the fibers 281 and 282 are rigidly affixed by the binder 24 and removed afterwards to maintain the air cavity. Otherwise, the cavity alignment feature 40 can be permanently placed between the fibers 281 and 282 to form a non-air-gap cavity. A relatively simple FP tunable filter can thus be formed from such a polymeric configuration.

In accordance with the teachings of the present invention, polymers and polymer processing to implement a relatively simple FP tunable filter are used. The polymeric FP tunable optical component 10 is based on using retainers 22, such as exemplified by the fiber gripper technology described in U.S. Pat. No. 5,359,687 and using the relatively high thermal expansion coefficient of polymer materials, preferably, as the heat-sensitive substrate 14. Fiber grippers have already been designed to allow for the easy assembly of low loss fiber splices.

This polymeric optical component 10 would be easier to manufacture and less costly to make because they can be made with standard photolithography in batches. The photolithography allows both inherent alignment and the feasibility of many devices to be made and assembled on a single substrate and then diced apart.

Figure 2:
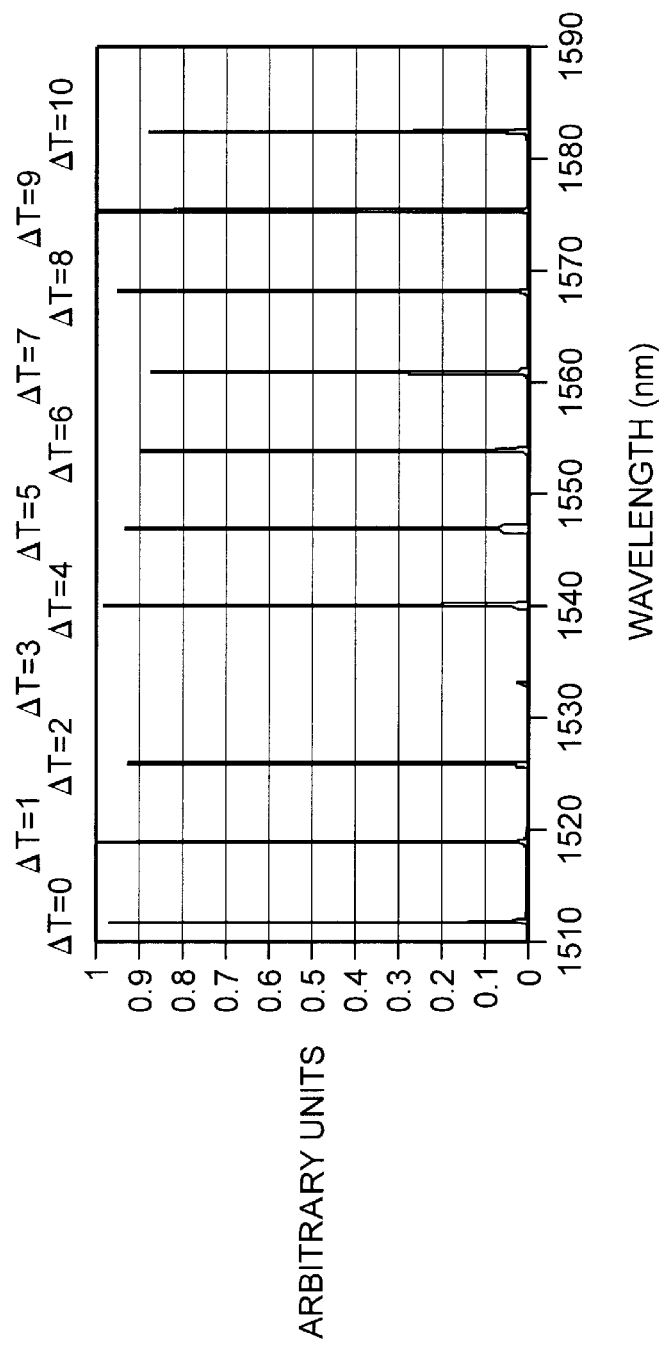
FIG. 2 is a chart showing the wavelength spectrum of the optical component 10 of FIG. 1, used as a thermally tunable Fabry-Perot filter, as a function of temperature, in accordance with the teachings of the invention.

According to the teachings of the present invention, the retainers 22, such as fiber grippers, provide a method to very accurately align two fibers whose ends will form the FP cavity. Within such a FP cavity configuration, the fiber gripper splices have been demonstrated to have insertion losses below 0.1 dB. The additional advantage in using this fiber gripper technology is that the fibers 281 and 282 can still be moved laterally, in and out of the grippers while maintaining a linear and vertical alignment. This flexibility is used to change the cavity length of the resonator 12 and hence the resonant frequency. The actual cavity length change comes from using the relatively high thermal expansion coefficient of polymers used preferably as the heat-sensitive substrate 14 to expand the cavity length of the resonator 12 when the substrate 14 expands also. As is known, the change in length 16 due to the thermal expansion of a material can be written as:

$$\Delta L = L \times CTE \times \Delta T \quad (eq.1)$$

Where $\Delta L$ is the change in length of a material, L is the length 16 of the material, CTE is the coefficient of thermal expansion, and $\Delta T$ is the change in temperature. As can be seen in equation 1, three variables can be controlled. The controllable or tunable variables are L, the length 16 of the substrate which is defined by the separation of the binder 24, preferably implemented with an adhesive binding agent such as adhesive joints in this example, the CTE of the substrate which is a polymer, for instance, and $\Delta T$, the amount of temperature change that can be tolerated or achieved. Example values of each of these variables to achieve a filter capable of tuning across the 1500–1600 nm band are: L=750 um, CTE=75 ppm, and $\Delta T$=10 degrees Celsius. Expected performance for a polymeric optical component, such as a FP filter, with the preceding parameters is demonstrated in FIG. 2. FIG. 2 shows the wavelength shift for the optical component 10, such as used as a tunable polymeric FP filter as it is heated by just 10 degrees Celsius.

Preferably, only the heat-sensitive substrate 14 expands and contracts with changing temperature. The retaining grippers 22 and adhesive-binding agents 24 insure a mechanical link between the fibers 281 and 282 and the substrate 14. Thus the expansion/contraction of the substrate 14 translates into a displacement of the fiber 281 and/or 282 such that the alignment of the optical fibers 281 and 282 are not substantially changed. Note that although an adhesive bond is shown as the binder 24, other bonds or binders can be used, such as a clamp or clip. Furthermore, although the substrate 14 is preferably polymeric, it can also be made from silica, silicon, or any other material that would change its length in response to a temperature change.

Referring back to FIG. 1, the reflective ends 381 and 382 can be a collimator-lens or a mirror facet. Although the fibers 281 and 282 and ends 381 and 382 are shown with straight lines for simplicity, they need not be merely planar mirror surfaces as depicted, but at least one of the ends 381 or 382 can be tapered, expanded at the end, or otherwise configured in the core area to form a collimator at the end, before deposition of the mirror-reflector.

Referring to FIG. 3, the pair of reflective ends is exemplified by a planar mirror facet as the first reflective end 381 of the first optical fiber 281 and a concave mirror facet as the second reflective end 382 for the second optical fiber 382. The extremity or end surfaces of at least one of the fibers 281 or 282 is made optionally concave to provide a "stable" FP resonator.

Figure 4:
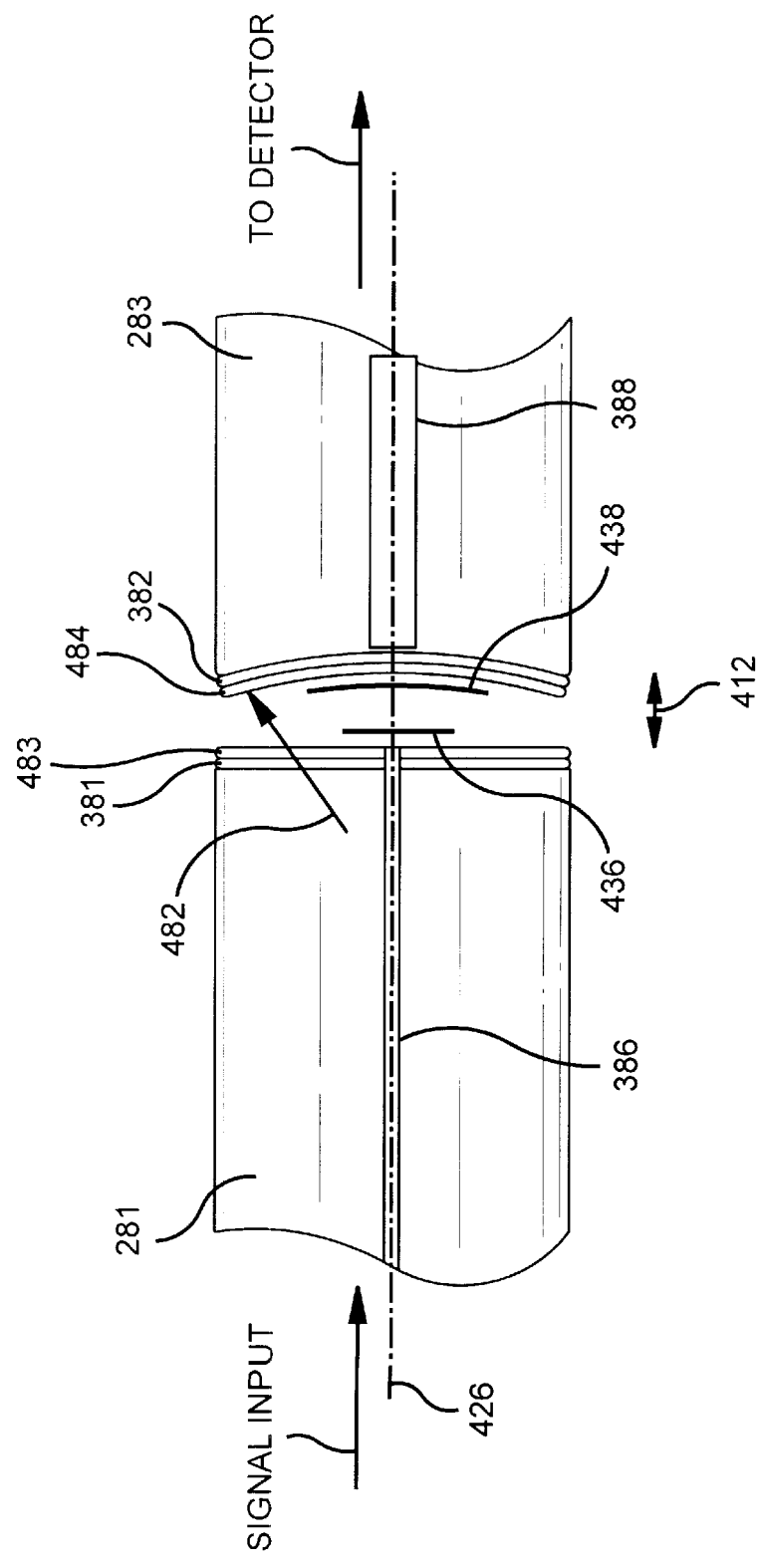
FIG. 4 is a simplified cross-sectional view of the optical component 10 of FIG. 3 taken through the optical axis, in accordance with the teachings of the invention.

Referring to FIG. 4, a closer side-view FP resonator of FIG. 3 is depicted. The optical wave entering from the first fiber core area 386 and present in an air gap 412, defined by the first and second reflective ends, will remain better confined in the resonator 12, along the optical axis 426 of the first and second fibers 281 and 282, because of the second concave receiving end 382. Upon arrival at the extremity or end of the first fiber 281, the optical wave is characterized by a flat wavefront 436 and a Gaussian amplitude profile. However, once in the air cavity or air gap 412, the optical wave diverges from the first fiber 281 to the second fiber 282 and the second wavefront 438 becomes spherical where less light would be coupled into the planar receiving end of the second fiber, if it were planar. As known in the theory of optical resonators for Gaussian beams, the flat-concave resonator is a "stable" configuration. According to the teachings of the present invention, the curvature radius of a concave mirror (made of the concave extremity or end 382 of the second fiber 282 and of a multilayer dielectric stack 484 disposed on the end to make a reflective surface) is made equal to the curvature radius 482 of the wavefront inside the cavity 412, at this particular location to limit the overall transmission loss of the resonator.

Accordingly, to better accommodate this spherical wavefront, the curvature radius of the receiving end or extremity of the second fiber is made concave, following the well-known optical wave equations. Thus the curvature of the cavity mirror 484 which is preferably deposited at the receiving end of the second fiber matches the curvature of the wavefront and the optical wave remains confined in the resonator.

The cavity mirors 483 and 484 on either of the first and second fibers are obtained by deposition of a sucessive multilayer stack of dielectric material. Preferably, this deposition is made both on the flat cleaved extremity, end or facet 381 of the first fiber and on the concave extremity 382 of the second fiber. The thickness of the stack is preferably small (a few μm). Hence, at the extremity of the first fiber 381, a flat mirror 483 results, and at the extremity of the second fiber 382, a concave mirror 484 results from the concave end surface 382 of the underlying fiber. The concave mirror (as viewed from the air gap 412) is thus formed from the extremity or end surface of the fiber, as a material support, for the top multilayer stack 484. Due to the curvature of the concave mirror most of the light rays are reflected back from where they come from. Thus, this flat-concave configuration is a very efficient resonator and a sufficient part of the energy can be coupled into the core of the second fiber 388.

EXAMPLES

The invention will be further clarified by the following examples which are intended to be exemplary of the invention. As an example, for using a standard single mode fiber having a beam radius of 5 μm for the core of the first fiber in a FP cavity having a FSR of 40 nm and a cavity length of 30 μm, at a mean wavelength λ=1.55 μm, the receiving end of the second fiber should have an optimum curvature radius of 117 μm at a beam radius of 5.8 μm. In a second FP cavity example having a FSR of 100 nm and a cavity length of 12 μm, the receiving end of the second fiber should have an optimum curvature radius of 229 μm at a beam radius of 5.14 μm. As can be seen by these examples, the beam radius at the receiving end of the second fiber is larger than the beam radius for the first standard single-mode fiber to better confine the light within the cavity.

Generally, the etalon, designed according to the present invention, has a single resonance in the C or L-bands. The etalon has cavities in the range of ~1 um to ~30 un providing a single filtering function in the 1400–1700 nm wavelength range. Free spectral range (FSR) for these etalons would be on the order of ~20 nm to 200 nm allowing the ability to select single channels.

Many methods to make a concave surface at the receiving end of the second fiber are possible, such as grinding, drilling, etching, polishing, molding or heating. Furthermore, the incoming end of the first fiber can also be made concave for another stable configuration. However, the two curvature radius values of the two fiber ends need not be identical in this concave-concave stable configuration.

Referring back to FIG. 1, one of three methods to maintain cavity finesse will be used. In the first method, a short material, such as the cavity alignment feature 40, is placed inside the cavity. Because the cavity feature 40 is short and placed below the optical path, it will not block the optical path in the cavity. In a second method, ultra-violet (UV) light is used to induce a small index variation in an adhesive material at the end of a fiber (and hence "write" a waveguide similar to providing a fiber grating). This "written" waveguide would be similar in function to the small fiber stub.

Lastly, the use of a very small cavity (<2 um) may not degrade the finesse F in such a sufficiently small cavity where the optical mode has no room to expand. In this case, the cavity is defined by growing the necessary dielectric mirror structure at the fiber ends and capping it off with the required thickness of oxide to finish defining the cavity.

Figure 6:
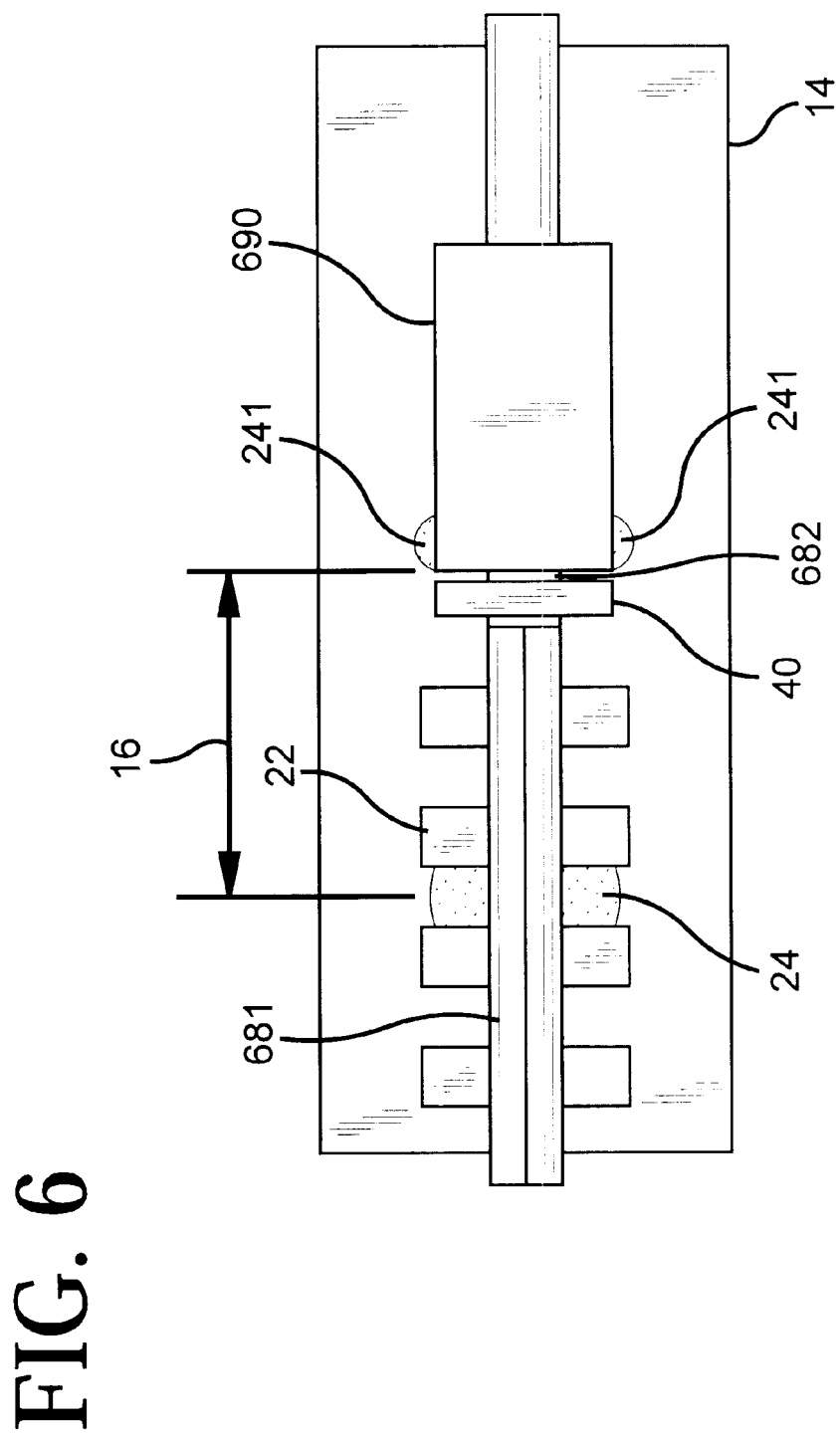
FIG. 6 is a top view of the optical component 10 having the second fiber 282 replaced by an integrated detector 690, in accordance with the teachings of the invention.

Other embodiments of the previously described three concepts to maintain cavity finesse would use different cavity geometries. For example, in an optical performance monitor (OPM) application there would be no need to go back into a single mode fiber 681, at the output end. Rather, the light could go directly into an optical detector 690, as seen in FIG. 6. Instead of using the second adhesive joint 241 to define the tunable substrate length L 16, a single-sided expansion of the substrate 14 can be provided just by having one adhesive joint 24 on the first fiber side. It is to be appreciated that the binder 24 is not limited to just adhesive joints, as shown by this example, but can be other attachment methods, such as welding. Eliminating the single-mode fiber output end leads to the availability of integrating the detector 690 into the cavity by having a dielectric mirror surface 682 to serve as the second reflective end for the resonance cavity, instead of using a fiber-to-fiber cavity. Of course the dielectric mirror can be planar or concave, as already taught by the present invention.

Figure 7:
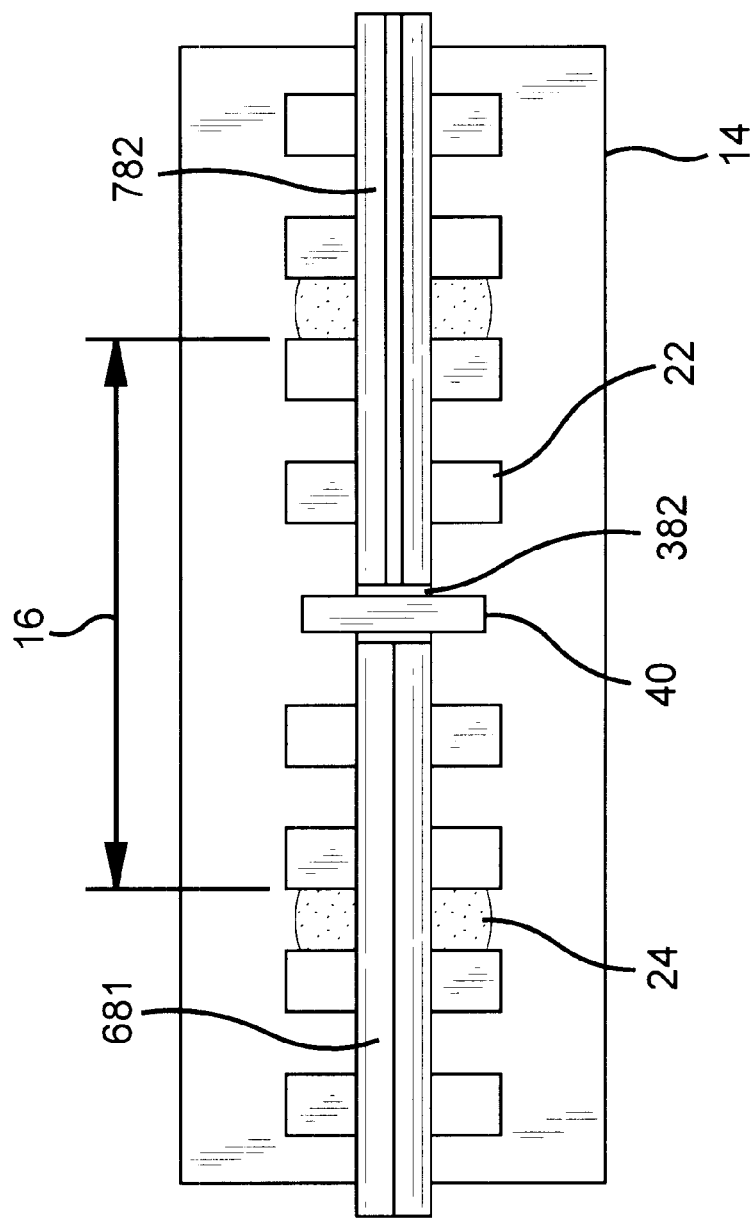
FIG. 7 is a top view of the optical component 10 having the second fiber implemented as a multimode fiber, in accordance with the teachings of the invention.

Referring to FIG. 7, the FP cavity could be made-up of the single mode fiber 681 and a multimode fiber 782 as another embodiment of the FP filter or etalon. Instead of using a single mode fiber or a multimode fiber, the second fiber can be any fiber with a core diameter larger than the core of a standard single-mode fiber, used as the first fiber, in order to more efficiently collect the beam that is transmitted by the FP resonator from the first fiber. Even the first fiber, along with the second fiber, can both be mode-expanders or have a portion that is a mode-expander.

The multimode fiber length, as the second fiber 782, is preferably very short (less than 10cm). Additionally, the detector (not shown in FIG. 7) that is connected at the end of this multimode fiber 782 is a "slow" detector as compared to a signal receiver. The slow detector will measure only an average power, and does not see the modulated signal that can be supported by a WDM channel. Consequently, the multimodal dispersion (phase effect) from the multimode fiber 782 should be negligible.

Figure 5:
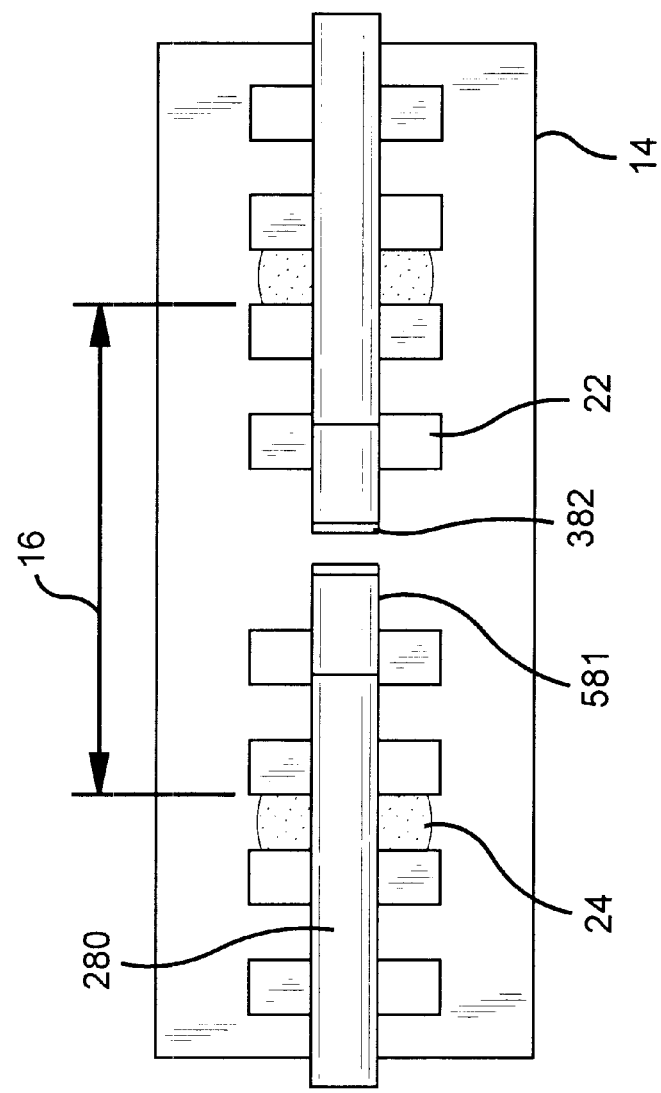
FIG. 5 is a top view of an optical component 10, using a special fiber containing a collimator, in accordance with the teachings of the invention.
Figure 10:
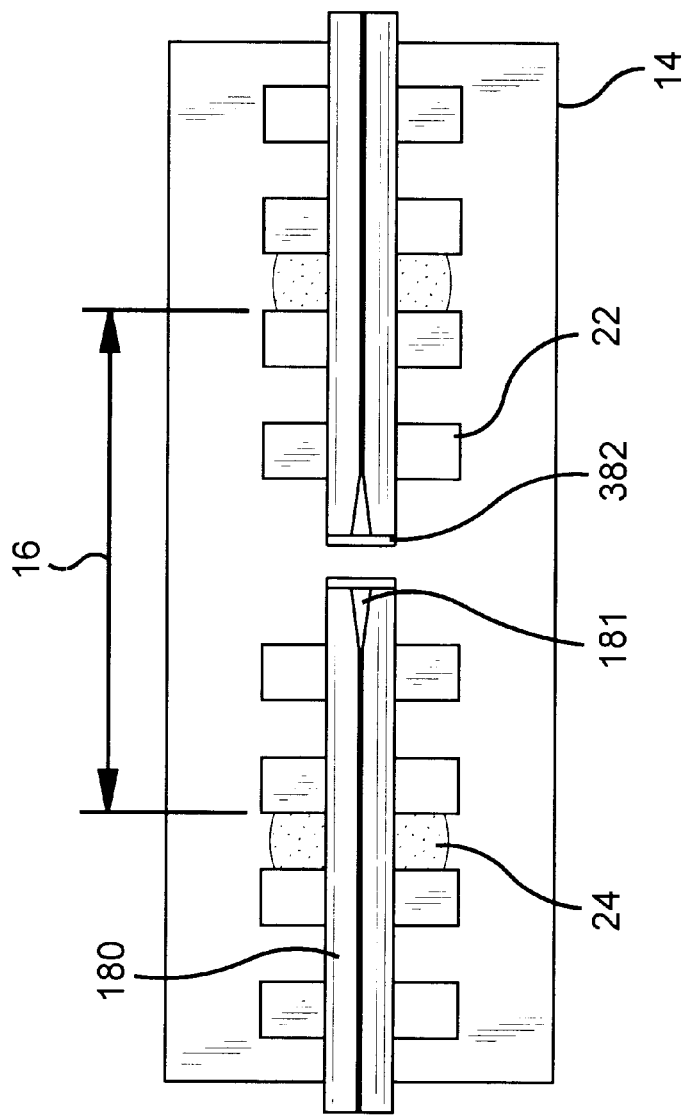
FIG. 10 is a top view of an optical component 10, using a special fiber containing an expanded core, in accordance with the teachings of the invention.

Referring to FIGS. 5 and 10, two other embodiments of the optical component 10 could use special fibers. These special fibers would reduce the diffractive effects of a small mode field diameter fiber of a conventional single mode fiber by expanding the mode field diameter. The expansion is accomplished by using a graded index fiber (of the correct length) to form a collimator 581 on the end of a fiber 280, as seen in FIG. 5. Another approach would use fibers 180 with tapered (expanded) core areas 181 to form a mode expander, as seen in FIG. 10. This expanded core area or region 581 is typically expanded by localized heating to allow diffusion of the core dopant.

In accordance with the teachings of the present invention, there are other applications that can utilize the inventive FP filter. By combining two filters 801 and 802 on the same substrate 14 with slightly different separations of the adhesive length 16 and 816 and/or the cavity length, a calibration of wavelength can be provided. The calibration is possible because the filter functions of these devices will only overlay for a single temperature in a wavelength sweep. This overlapping wavelength can even be outside of the communication band and would use an inexpensive laser source. The calibration setup is shown in FIG. 8.

Figure 9:
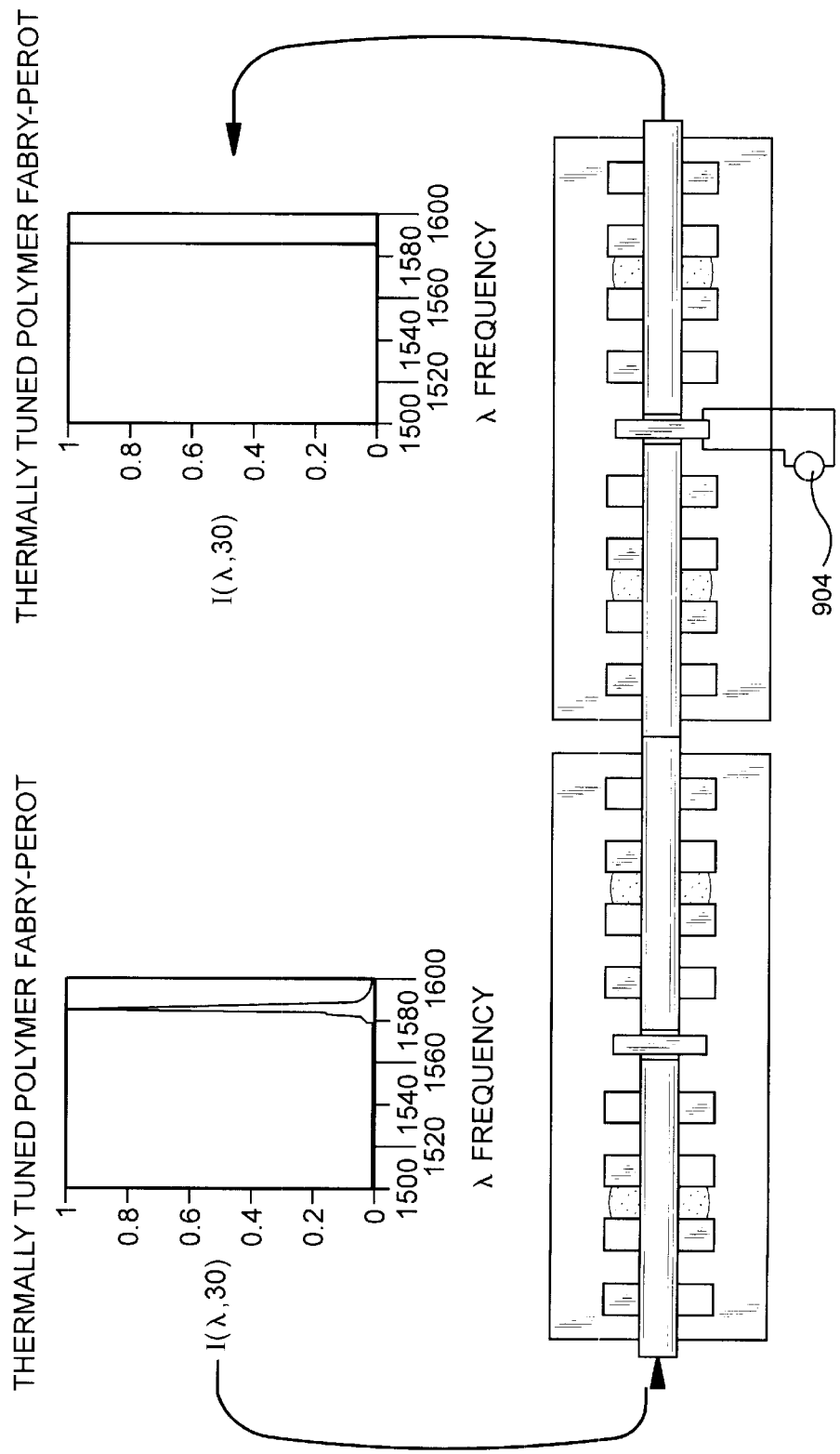
FIG. 9 is a representation of a thermally tuned electrically modulated Fabry-Perot high speed laser source, implemented by similar optical components 10 of FIG. 1, in accordance with the teachings of the invention.

By extending the filtering concept, in accordance with the teachings of the present invention, a high-speed modulated tunable-wavelength laser source can be achieved. Referring to FIG. 9, an electro-optic (EO) polymer material is used for the cavity alignment feature 940 in a second polymeric FP filter 902 that is combined with a first non-EO polymeric FP filter 801 for modulating (at high speed) an inexpensive laser source. In this example, the material 940 inside the cavity of the second polymeric FP filter is electro-optic. By applying an electric field 904 across the EO material 940, a change in the refractive index inside the cavity is induced. By overlaying the filter function from a modulated and un-modulated filter (both of which are wavelength tuned by the same heater), a high-speed narrow-band laser modulator is achieved.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical component, comprising:
   a fiber Fabry-Perot resonator having a pair of optical fibers each having a reflective end for opposing and separating from each other to provide a resonance cavity;
   a substrate having a variable length for supporting and tuning the resonance cavity of the fiber Fabry-Perot resonator by varying the variable length of the substrate in response to a stimulus;
   a plurality of fiber retainers disposed on the substrate for mounting and aligning the pair of optical fibers; and
   a pair of binders disposed on the substrate for fixedly positioning the pair of optical fibers to the substrate and to define the variable length.

2. The optical component of claim 1, wherein the plurality of fiber retainers comprises:
   two rows of optical fiber grippers having at least two optical fiber grippers in each row, wherein each of the optical fiber grippers has an inner surface facing one of two parallel axes such that a substantially axial passage is formed for mounting the pair of optical fibers through the substantially axial passage.

3. The optical component of claim 2, wherein the inner surfaces of the two rows of optical fiber grippers face each other such that the substantially axial passage formed resembles a V-groove.

4. The optical component of claim 1, further comprising pair of collimators inserted in between each of the pair of the optical fibers and the reflective ends of the fibers.

5. The optical component of claim 1, wherein at least one reflective end of the pair of optical fibers comprises a concave mirror facet.

6. The optical component of claim 1, wherein at least one reflective end of the pair of optical fibers comprises a planar mirror facet.

7. The optical component of claim 1, wherein the pair of binders comprises a pair of adhesive bonds.

8. The optical component of claim 1, further comprising a detector for replacing one optical fiber and for attaching to the reflective end.

9. An etalon-based assembly, comprising:
   a first reflector;
   a second reflector facing the first reflector and separated from the first reflector to provide a Fabry-Perot resonance cavity;
   a first optical fiber coupled to the first reflector;
   an optical component coupled to the second reflector for forming a Fabry-Perot resonator;
   a substrate having a variable length for supporting and tuning the resonance cavity of the fiber Fabry-Perot resonator by varying the variable length of the substrate in response to a stimulus;
   a plurality of retainers disposed on the substrate for mounting and aligning the first optical fiber; and
   a pair of binders disposed on the substrate for fixing the axial positioning of the first optical fiber and the optical component to the substrate, and to define the variable length.

10. The etalon-based assembly of claim 9, wherein the optical component is a detector.

11. The etalon-based assembly of claim 9, wherein the optical component is an optical fiber.

12. The etalon-based assembly of claim 9, wherein the optical component is a multi-mode fiber.

13. The etalon-based assembly of claim 9, wherein the first optical fiber and the optical component are single-mode fibers.

14. The etalon-based assembly of claim 9, wherein the first optical fiber and the optical component are a pair of fibers each having a mode-transformer end for attaching to the reflectors.

15. The etalon-based assembly of claim 9, wherein the first optical fiber and the optical component are a pair of fibers each having a collimator end for attaching to the reflectors.

16. The etalon-based assembly of claim 9, wherein the substrate is made from a polymer which is expandable in response to the stimulus of heat.

17. The etalon-based assembly of claim 9, wherein the plurality of retainers are made from a polymer.

18. The etalon-based assembly of claim 9, wherein the substrate is made from silica which is expandable in response to the stimulus of heat.

19. The etalon-based assembly of claim 9, wherein the substrate is made from a piezoelectric material which is expandable in response to the stimulus of voltage.

20. A method for assembling an etalon, comprising the steps of:
   providing a first reflector;
   separating a second reflector from the first reflector to provide a Fabry-Perot resonance cavity;
   coupling a first optical fiber to the first reflector;
   coupling an optical component to the second reflector for forming a Fabry-Perot resonator;
   supporting the Fabry-Perot resonator on a substrate having a variable length;
   mounting and aligning the first optical fiber on the substrate; and
   fixing the alignment of the first optical fiber and the optical component to the substrate; and
   tuning the resonance cavity of the fiber Fabry-Perot resonator by varying the variable length of the substrate.

* * * * *